(12) United States Patent  
Nakamura

(10) Patent No.: US 8,553,258 B2  
(45) Date of Patent: Oct. 8, 2013

(54) IMAGE COMMUNICATION SYSTEM, IMAGE READING DEVICE AND COMMUNICATION DEVICE WITH EVALUATION INFORMATION INDICATES RE-READING OF THE IMAGE IS NECESSARY INCLUDES AN ADDITIONAL IMAGE CORRESPONDING TO THE IMAGE DATA

(75) Inventor: Tomoki Nakamura, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 326 days.

(21) Appl. No.: 12/728,609

(22) Filed: Mar. 22, 2010

(65) Prior Publication Data

US 2011/0026074 A1 Feb. 3, 2011

(30) Foreign Application Priority Data

Jul. 31, 2009 (JP) ................................. 2009-178612

(51) Int. Cl.  
*G06F 15/00* (2006.01)

(52) U.S. Cl.  
USPC ......................................... 358/1.15; 358/448

(58) Field of Classification Search  
USPC ................................................ 358/1.15, 448  
See application file for complete search history.

(56) References Cited

U.S. PATENT DOCUMENTS

| 5,946,457 | A * | 8/1999 | Nakai et al. ................... 358/1.13 |
| 2005/0231746 | A1* | 10/2005 | Parry et al. .................... 358/1.13 |
| 2006/0215181 | A1* | 9/2006 | Sugimoto et al. .............. 358/1.1 |
| 2006/0215210 | A1* | 9/2006 | Sugimoto ..................... 358/1.14 |
| 2006/0271675 | A1* | 11/2006 | Wakazono et al. ........... 709/224 |
| 2008/0273227 | A1* | 11/2008 | Dattilo et al. ................. 358/448 |

FOREIGN PATENT DOCUMENTS

| JP | 2000-112593 A | 4/2000 |
| JP | 2006-163288 A | 6/2006 |
| JP | 2009-033451 A | 2/2009 |

* cited by examiner

*Primary Examiner* — Qian Yang  
(74) *Attorney, Agent, or Firm* — Scully, Scott, Murphy & Presser, P.C.

(57) ABSTRACT

An image communication system, comprising an image reading device; and a communication device, wherein the image reading device comprises an image reading unit; a transmission unit to transmit the image date to a communication device; an evaluation information receiving unit to receive evaluation information indicating that re-reading of the image is necessary from the communication device; and a display unit to display the evaluation information, and wherein the communication device comprises: an image data receiving unit to receive the image data; an image data display unit to display an image corresponding to the image data; a command reception unit to receive an execution command for executing re-reading of the displayed image; an evaluation information generation unit to generate the evaluation information in response to receipt of the execution command; and an information transmission unit to transmit the evaluation information to the image reading device.

15 Claims, 7 Drawing Sheets

IMAGE COMMUNICATION SYSTEM, IMAGE READING DEVICE AND COMMUNICATION DEVICE WITH EVALUATION INFORMATION INDICATES RE-READING OF THE IMAGE IS NECESSARY INCLUDES AN ADDITIONAL IMAGE CORRESPONDING TO THE IMAGE DATA

CROSS-REFERENCE TO RELATED APPLICATION

This application claims priority under 35 U.S.C. §119 from Japanese Patent Application No. 2009-178612, filed on Jul. 31, 2009. The entire subject matter of the application is incorporated herein by reference.

BACKGROUND

1. Technical Field

Aspects of the present invention relate to an image reading device, a communication device and an image communication system.

2. Related Art

Image reading devices configured to read an image from a document by illuminating the document and receiving reflected light from the document and to generate image data corresponding to the read image have been widely used. For example, such an image reading device is used as follows. When a user A executes image reading on a multifunction peripheral A (having a function as an image reading device) connected to a network, the user A checks image data generated on the image reading device A, and creates information on evaluation for the generated image data. If the image data includes a page for which a reading failure has occurred, evaluation information indicating that re-rereading is necessary for the failed page of the image data is created. Then, the user A transmits the evaluation information to an image storage device connected to the network. In this case, a user B checks the evaluation information stored in the image storage device on a multifunction peripheral B (having a function as n image reading device), and executes a re-reading operation on the multifunction peripheral B for the failed page.

SUMMARY

In the above described system configuration, in order to transmit the evaluation information to the user B of the multifunction peripheral B on which the re-reading is performed, it is required to provide another multifunction peripheral (i.e., the multifunction peripheral A) in addition to the multifunction peripheral B on the network, and the user A is required to perform the image reading and to create the evaluation information on the multifunction peripheral A. That is, in order to transmit the evaluation information, it is required to provide more than one multifunction peripherals on the network.

Aspects of the present invention are advantageous in that at least one an image reading device, a communication device and an image communication system configured such that, even if the image communication system has only one image reading device, evaluation information indicting whether re-reading of an image is necessary can be securely transmitted to an operator of the image reading device is provided.

According to an aspect of the invention, there is provided an image communication system, comprising: an image reading device; and a communication device. The image reading device comprises: an image reading unit configured to execute a reading operation to read an image from a document to generate image data corresponding to the read image; a transmission unit configured to transmit the image date generated by the image reading unit to a communication device which is communicatably connected to the image reading device; an evaluation information receiving unit configured to receive evaluation information from the communication device, the evaluation information indicating that re-reading of the image corresponding to the image data transmitted to the communication device is necessary; and a display unit configured to display the evaluation information received by the evaluation information receiving unit. The communication device comprises: an image data receiving unit configured to receive the image data from the image reading device communicatably connected to the communication device; an image data display unit configured to display an image corresponding to the image data received by the image data receiving unit; a command reception unit configured to receive an execution command for executing re-reading of the image corresponding to the image data displayed by the image data display unit; and an evaluation information generation unit configured such that, in response to receipt of the execution command by the command reception unit, the evaluation information generation unit generates the evaluation information indicating that re-reading of the image corresponding to the image data indicated by the execution command is necessary; and an information transmission unit configured to transmit the evaluation information generated by the evaluation information generation unit to the image reading device.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

DETAILED DESCRIPTION

Hereafter, an embodiment according to the invention will be described with reference to the accompanying drawings.

Figure 1:
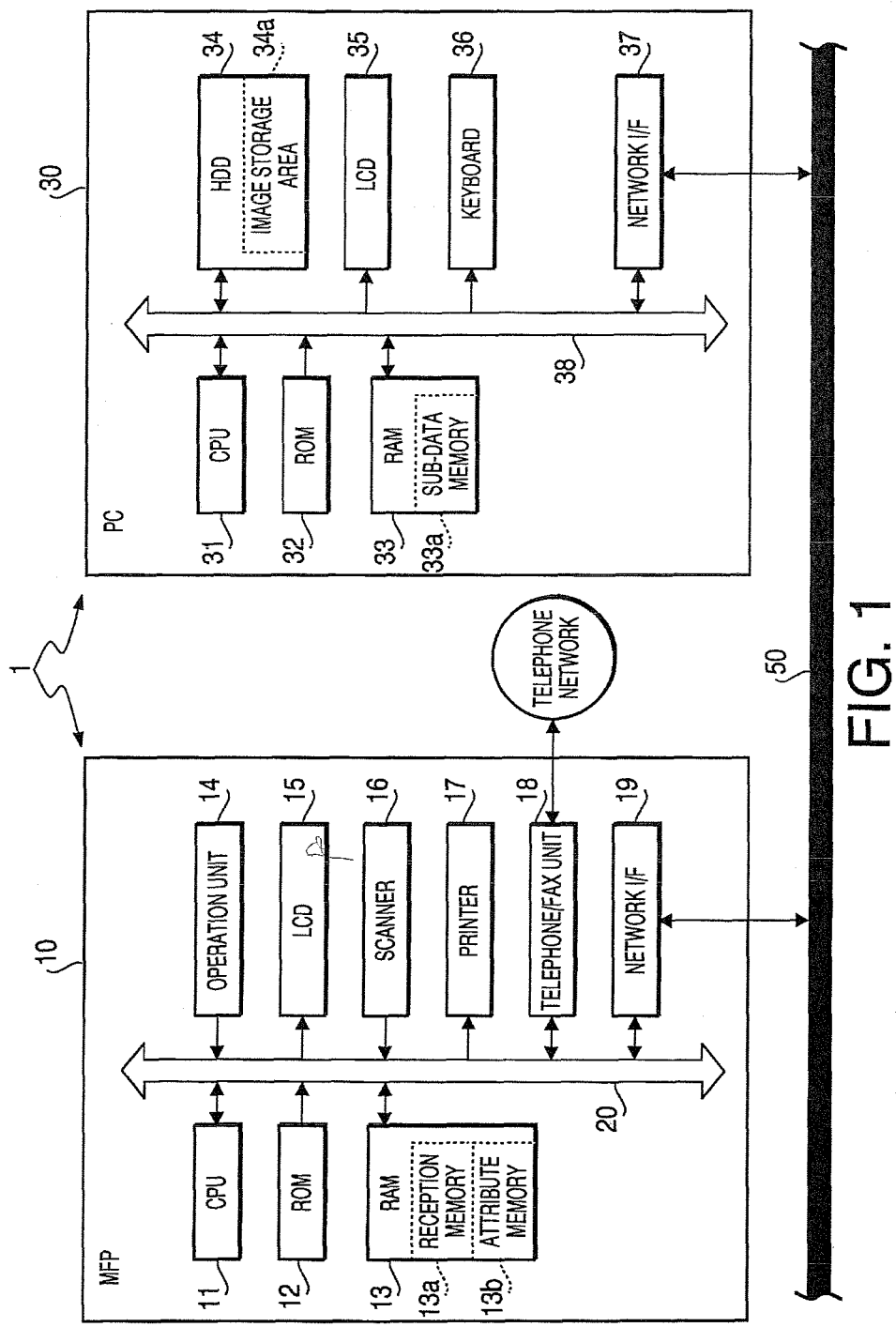
FIG. 1 is a block diagram illustrating a system configuration of an image communication system according to an embodiment.

As shown in FIG. 1, an image communication system 1 includes an MFP (Multi Function Peripheral) 10 and a PC (Personal Computer) 30 which are connected to each other via a network 50. It should be noted that although in FIG. 1 one MFP 10 and one PC 30 are provided, more than one MFPs 10 and more that one PCs 30 may be provided in the image communication system 1.

The MFP 10 has multiple functions including a facsimile function and a print function. The MFP 10 includes a CPU 11, a ROM 12, a RAM 13, an operation unit 14 an LCD 15, a scanner 16, a printer 17, a telephone/fax unit 18 and a network interface 19. These units 11 to 19 are connected to an input/output port 20.

The CPU 11 controls the units 11 to 19 connected to the input/output port 20. The ROM 12 stores programs to be executed on the MFP 10. Various processes described below are executed under control of the CPU 11 by executing the programs stored in the ROM 12.

The RAM 13 temporarily stores various types of data. The RAM 13 has a reception memory 13a and an attribute memory 13b.

The reception memory 13a stores response data transmitted from the PC 30. The response data includes data representing evaluation with respect to image data which is generated by the MFP 10 by reading an image through the scanner 16. The evaluation data which is inputted to the PC 30 by an operator includes five types of data including result information, image data, text data, attached image data and an image ID. Among the five types of data, four types of data including the result information, the image data, the text data and the attached image data are stored in the reception memory 13a. In the following, the four types of data stored in the reception memory 13a are referred to as basic data. The image ID included in the response data is stored in the attribute memory 13b.

The result information represents information as to whether re-reading of the image corresponding to the image data is necessary. More specifically, the result information represents "OK" when the re-reading of the image is not necessary, and the result information represents "NG" when the re-reading of the image is necessary. The image data included in the basic data is transmitted by the MFP 10 and is received by the PC 30. The text data included in the basic information represents comments or messages inputted by an operator of the PC 30. The attached image data included in the basic data is used as a supplementary illustration for the text data.

The attribute memory 13b stores an image ID included in the received response data and an IP address of the PC 30 which has transmitted the response data. The image ID serves to identify the image data which the operator of the PC 30 has evaluated. Each image ID is assigned by the PC 30. Hereafter, the data stored in the attribute memory 13b is referred to as "attribute data".

In response to receipt of the response data from the PC 30, the CPU 11 of the MFP 10 stores the basic data included in the response data in the reception memory 13a, and stores the image ID included in the response data in the attribute memory 13b. In this case, the CPU 11 associates the basic data stored in the reception memory 13a with the image ID stores in the attribution memory 13b, and stores data representing such a correspondence (hereafter, frequently referred to as correspondence data) between the basic data and the image ID in a work area (not shown) in the RAM 13. By referring to the correspondence data, the CPU 11 is able to identify the attribute data to which the basic data belongs, and to identify the attribute data with which the basic data is associated.

The operation unit 14 has, for example, operation keys to be used by the operator of the MFP 10. The LCD 15 includes a display device, such as an LCD panel. The scanner 16 is configured to illuminate a document with a light source, to read light reflected from the document and to generate image data corresponding to an image formed on the document.

The printer 17 has a function as a printer, and the telephone/fax unit 18 has functions as a facsimile device and a telephone. The network interface 19 interfaces the MFP 10 with the network 50. Therefore, the MFP 10 is able to transmit the image data generated by the scanner 16 to the PC 30, and to receive the response data transmitted by the PC 30.

The PC 30 is a communication device communicatably connected with the MFP 10. The PC 30 includes a CPU 31, a ROM 32, a RAM 33, an HDD (Hard Disk Drive) 34, an LCD 35, a keyboard 36 and a network interface (I/F) 37. These units 31 to 37 are connected to an input/output port 38.

The CPU 31 controls the units 31 to 37 connected to the input/output port 38. The ROM 32 stores programs to be executed on the PC 30. Various processes described below are executed under control of the CPU 31 by executing the programs stored in the ROM 32.

The RAM 33 temporarily stores various types of data. The RAM 33 includes a sub-data memory 33a. The sub-data memory 33a stores four types of data including a storage address (an address on the HDD) representing an storage address of the received image data, comment data received together with the image data, an image ID generated by the PC 30, and an IP address of the MFP 10 which has transmitted the image data. In the following, the data stored in the sub-data memory 33a is referred to as "sub-data".

The HDD 34 stores various types of data. The HDD 34 has an image storage area 34a. The image storage area 34a stores image data received by the PC 30. The LCD 35 is, for example, an LCD panel. The network interface 37 interfaces the PC 30 with the network 50. Therefore, the PC 30 is able to receive the image data form the MFP 10, and to transmit the response data to the MFP 10.

Hereafter, various process executed on the MFP 10 are explained with reference to FIGS. 2 to 4 and FIGS. 7A to 7C.

First, a scanning process executed on the MFP 10 is explained with reference to FIG. 2. The scanning process is executed, for example, when the MFP 10 detects that a document is placed on the scanner 16, when a scan button (not shown) on the operation unit 14 is pressed, or when a scan command is inputted from the PC 30.

Figure 7D:
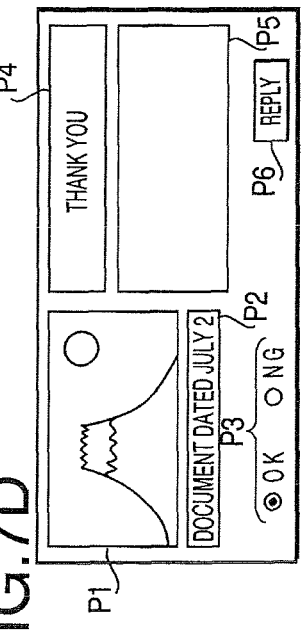
FIGS. 7D and 7E are examples of onscreen representation on a display of the PC.
Figure 7E:
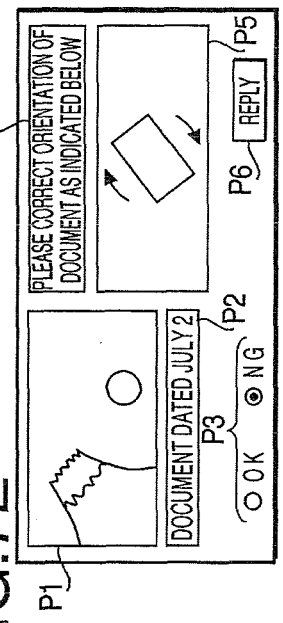
Figure 7A:
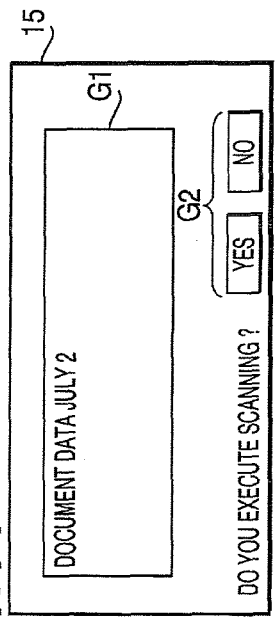
FIGS. 7A to 7C are examples of onscreen representation on a display of the MFP.

First, the CPU 11 of the MFP 10 displays a text input screen G1 and a scan start button G2 on the LCD 15 as shown in FIG. 7A (step S21). Through the text input screen G1, the operator of the MFP 10 is able to input comments to be informed to the operator of the PC 30 by using the operation unit 14 (e.g., mechanical keys or software keys). The comment data corresponding to the inputted comments is transmitted to the PC 30 together with image data. Regarding the scan start button G2, "YES" button is used to instruct the MFP 10 to execute scanning an image formed on a document, and "NO" button is used to instruct cancellation of scanning.

After step S21 is processed, the CPU 11 judges whether execution of scanning is instructed by the scan start button G2 (step S22). If execution of scanning is instructed (S22: YES), control proceeds to step S23. On the other hand, if execution of scanning is not instructed (S22: NO), step S22 is repeated. If cancellation is selected, the scanning process is terminated.

In step S23, by reading an image formed on the document, the CPU 11 execute scanning for generating image data corresponding to the image. Then, the CPU 11 associates the generated image data with the comment data inputted through the text input screen G1 (see FIG. 7A) to generate scanned data. Then, the CPU 11 of the MFP 10 transmits the scanned data to the PC 30 (step S24). It should be noted that when step S24 is processed for the first time, the CPU 11 transmits a command indicating start of transmission of scanned data to the PC 30 before transmission of the scanned data. Furthermore, in this case, the CPU 11 includes information indicating the number of transmissions of scanned data in the command indicating start of transmission of scanned data. From the second transmission of scanned data, the command including the information indicating the number of transmissions is not transmitted. The information indicating the number of transmissions of scanned data is determined in accordance with the number of scans set by the operator of the MFP 10 (i.e., the number of sheets of paper of the document to be scanned).

After step S24 is processed, the CPU 11 judges whether the scanning has finished for all the images (step S25). When the scanning has not finished for all the images (S25: NO), control returns to step S23. When the scanning has finished for all the images (S25: YES), the scanning process terminates. The judgment in step S25 is processed by judging whether the scanning has been executed the set number of times set in advance by the operator of the MFP 10 or by judging whether the scanner 16 moves to a state where no document is placed on the scanner 16. When the scanning has finished for all the images (S25: YES), the CPU 11 transmits a command indicating completion of transmission of scanned data to the PC 30.

Figure 2:
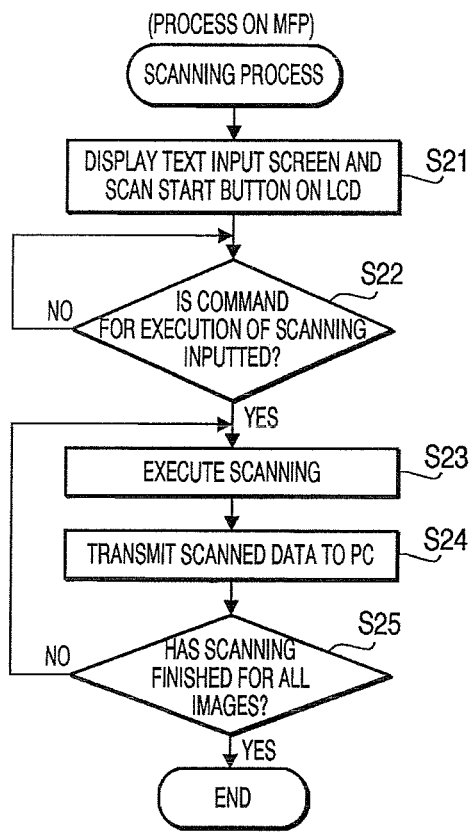
FIG. 2 is a flowchart illustrating a scanning process executed by an MFP.

In the scanning process shown in FIG. 2, step S24 may be executed after completion of step S25 and before transmission of the command indicating completion of transmission of scanned data. In this case, the scanned data including the image data generated in step S23 by the timer when the judgment result in step S25 becomes "YES" is transmitted in order that the documents are read (i.e., in order that the images are read). Furthermore, in this case, the number of executions may be counted each time step S23 is processed, and the number of counts of executions may be regarded as the number of transmissions of scanned data. Regarding the configuration in which the number of counts of executions is regarded as the number of transmissions of scanned data, it becomes possible to eliminate the need for setting the number of scans by the operator of the MFP 10.

Figure 3:
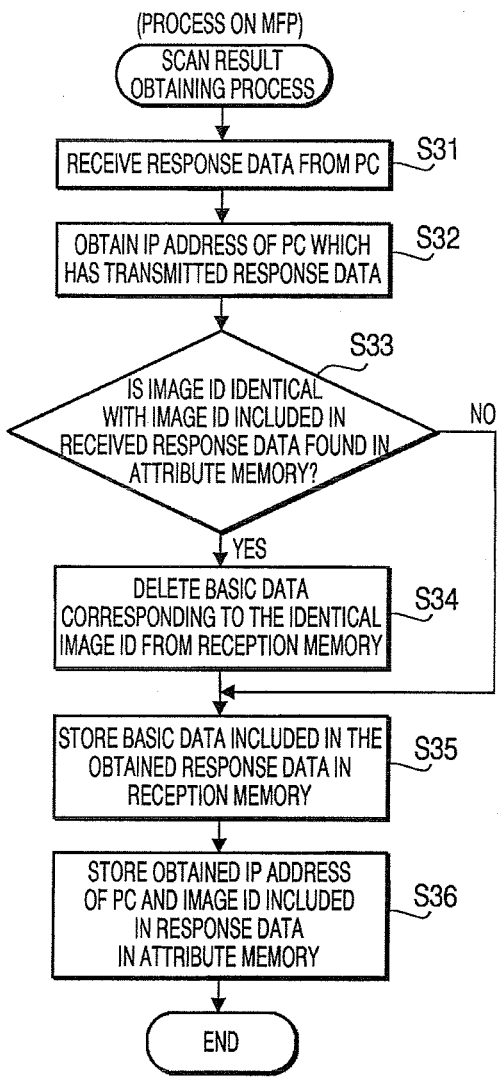
FIG. 3 is a flowchart illustrating a scan result obtaining process executed by the MFP.

Hereafter, a scan result obtaining process executed on the MFP 10 is explained with reference to FIG. 3. The scan result obtaining process is executed each time the MFP 10 receives a command indicating start of transmission of response data from the PC 30. In the scan result obtaining process, the basic data included in the response data is stored in the reception memory 13a, and the image ID included in the response data and an IP address of the PC 30 which has transmitted the response data are stored in the attribute memory 13b.

First, the CPU 11 of the MFP 10 receives the response data from the PC 30 (step S31). Then, the CPU 11 instructs the PC 30 to transmit the IP address of the PC 30 which has transmitted the response data, and obtains the IP address (step S32). Then, the CPU 11 judges whether an image ID identical with the received image ID included in the received response data is already stored in the attribute memory 13b (step S33).

If the judgment result of step S33 is "YES", the response data including the image ID has already been received, and the basic data included in the response data has already been stored in the reception memory 13a. Therefore, in this case, the CPU 11 deletes, from the reception memory 13a, the basic data corresponding to the image ID identical with the received image ID included in the response data received at this time so as to overwrite the old basic data with the basic data included in the response data received at this time (step S34). Then, the CPU 11 stores the basic data included in the obtained response data in the reception memory 13a (step S35).

On the other hand, when the judgment result in step S33 is "NO", the response data including the image ID has been received for the first time, and step S35 is processed without processing step S34.

After step S35 is processed, the IP address of the PC 30 obtained in step S32 and the image ID included in the response data received in step S31 are stored in the attribute memory 33b (step S36). Then, the scan result obtaining process terminates. In step S36, if the judgment result of step S33 is "YES", the CPU 11 writes the IP address of the PC 30 and the image ID to the attribute data containing the image ID identical with the image ID included in the response data obtained at this time.

Hereafter, a scan result check process executed on the MFP 10 is explained with reference to FIG. 4. The scan result check process is executed when a confirmation button (not shown) provided in the operation unit 14 is pressed, each time the response data is received in the scan result obtaining process, or when a command indicating completion of a reply with respect to the image data is received from the PC 30 in the scan result obtaining process.

First, the CPU 11 judges whether the basic data is stored in the reception memory 13a (step S41). When the basic data is not stored in the reception memory 13a (S41: NO), the scan result check process terminates because in this case the basic data is not stored in the reception memory 13a and therefore no evaluation result can be displayed. When the basic data is stored in the reception memory 13a (S41: YES), the CPU 11 obtains all the image data from the reception memory 13a, and displays a list of the image data on the LCD 15 while requesting the operator of the MFP 10 to select one of the image data for which the operator of the MFP 10 wants to display the evaluation result inputted by the operator of the PC 30 (step S42).

Next, the CPU 11 judges whether image data is selected from the list of image data displayed on the LCD 15 (step S43). When the image data is not selected (S43: NO), step S43 is repeated until the image data is selected from the list. When the image data is selected from the list (S43: YES), the CPU 11 obtains the basic data including the selected image data from the reception memory 13a, and judges whether result information included in the obtained basic data is "OK" which indicates that re-scanning is not necessary (step S44).

Figure 7B:
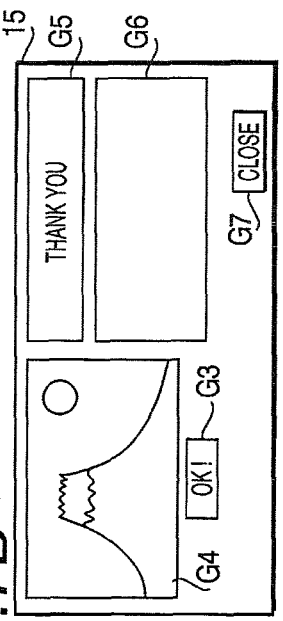

If the result information is "OK" (S44: YES), the CPU 11 displays a result screen indicating "OK" on the LCD 15 (step S45). In step S45, as shown in FIG. 7B, a result information display screen G3, an image data display screen G4, a text data display screen G5, an attached image data display screen G6 and a "Close" button G7 are displayed on the LCD 15. The result information display screen G3 displays the result information included in the basic data obtained in step S44. Letters "OK!" are displayed on the result information display screen G3. The image data display screen G4 displays an image corresponding to the image data included in the basic data obtained in step S44. In the image data display screen G4, the image that the MFP 10 has transmitted to the PC 30 (i.e., the image data evaluated as "OK") is displayed.

The text data display screen G5 displays text data included in the basic data obtained in step S44. In the text data display screen G5, the comments "Thank you." inputted by the operator of the PC 30 are displayed. The attached image data display screen G6 is used to display attached image data included in the basic data obtained in step S44. Since FIG. 7B displays a state where the received response data does not include the attached image data, no image is displayed in the attached image data display screen G6. The "Close" button G7 is used to terminate displaying of the result screen, and to move to step S46.

The result screen of step S45 indicates that re-reading of the image is not necessary. Therefore, when display of the result screen is finished, the basic data and the attribute data corresponding to the selected image data become unnecessary. In this case, the basic data corresponding to the selected image data is deleted from the reception memory 13a (step S46), and the attributed data corresponding to the selected image data is deleted from the attribute memory 13b (step S47). After S47 is processed, the scan result check process terminates.

Figure 7C:
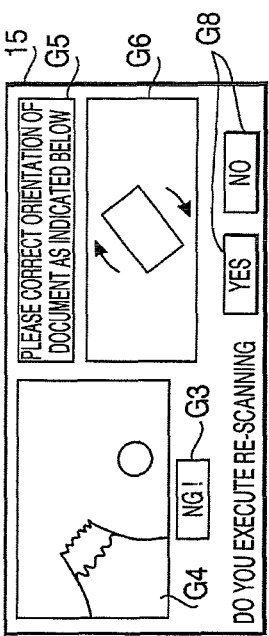

If the result information is not "OK" (S44: NO), the CPU 11 displays a result screen indicating a "NG" status where re-reading of the image corresponding to the image data is necessary (step S48). In step S48, as shown in FIG. 7C, letters "NG!" are displayed in the result information display screen G3. In the image data display screen G4, the image that the MFP 10 has transmitted to the PC 30 (i.e., the image data evaluated as "NG") is displayed. In the text data display screen G5, the comments "Please correct orientation of the document as indicated below." inputted by the operator of the PC 30 are displayed.

In the attached image display screen G6, a supplementary illustration for understanding instructions (the text data) is displayed. Further, a re-scanning button G8 is displayed. The re-scanning button G8 has a "YES" button for executing the re-scanning and a button "NO" for not executing the re-scanning When one of the "YES" button and the "NO" button is pressed, the display of the result screen is terminated, and control proceeds to step S49.

In step S49, the CPU 11 receives a command for executing the re-scanning (step S49). More specifically, the CPU 11 judges whether the pressed button is the "YES" button. If the pressed button is the "YES" button (S49: YES), control proceeds to step S50 where the same process as that of step S23 (i.e., reading of the image corresponding to the image data for which the re-scanning is instructed is performed to generated image data) is executed. Then, the CPU 11 obtains the attribute data corresponding to the image data for which the re-scanning is instructed in step S48, from the attribute memory 13b (step S51). Locating of the attribute data corresponding to the image data is executed using the correspondence data stored in the work area of the RAM 13. After S51 is processed, the CPU 11 transmits the scanned data (i.e., the image data generated again and the comment data) and the image ID included in the attribute data, to the PC 30 having the IP address included in the obtained attribute data (step S52). Then, control proceeds to step S53.

It should be noted that in step S52, the command indicating start of transmission of the scanned data is transmitted before transmission of the scanned data as in the case of step S24. In this case, the information indicating the number of transmissions of scanned data is not included, and the command will not be transmitted from the second time execution of transmission of scanned data.

When the re-scanning is not instructed (S49: NO), control proceeds to step S53 after steps S46 and S47 are processed.

It is understood that step S50 is processed only when the result information of the image data indicates "NG" and the command for re-scanning is inputted (see S49). Therefore, the MFP 10 does not necessarily transmit the image data again to the PC 30, without exception, when the result information is "NG", but transmits the image data again to the PC 30 on the condition that the result information is "NG" and the command for re-scanning is inputted. Accordingly, through the MFP 10, the operator is able to select the image data to be re-transmitted to the PC 30.

In step S53, the CPU 11 judges whether the check for the evaluation results for all the image data in the same group of image data selected in step S43 has finished. If the image data selected in step S43 includes, for example, five pages of image data (hereafter, such image data is frequently referred to as "group image data"), a common group ID is assigned to each image ID separately by the PC 30. Therefore, in step S53, if a group ID is assigned to the image ID corresponding to the image data selected in S43, the CPU 11 searches for other image data to which the same group ID is assigned, and judges whether the check for the result information for all the image data having the same group ID has finished. If the judgment result in step S53 is "NO", control returns to step S43 to execute steps from S44 for the image data for which check of the result information is not processed.

On the other hand, the check for the evaluation results has finished for all the image data having the same group ID (S53: YES), the scan result check process terminates. If the image data selected in step S43 is a single pieces of image data, a group ID is not assigned to the image data. Therefore, in this case, the judgment result in step S53 becomes "YES". When the judgment result in step S53 is "YES", the CPU 11 transmits a command indicating completion of transmission of the scanned data to the PC 30.

Figure 4:
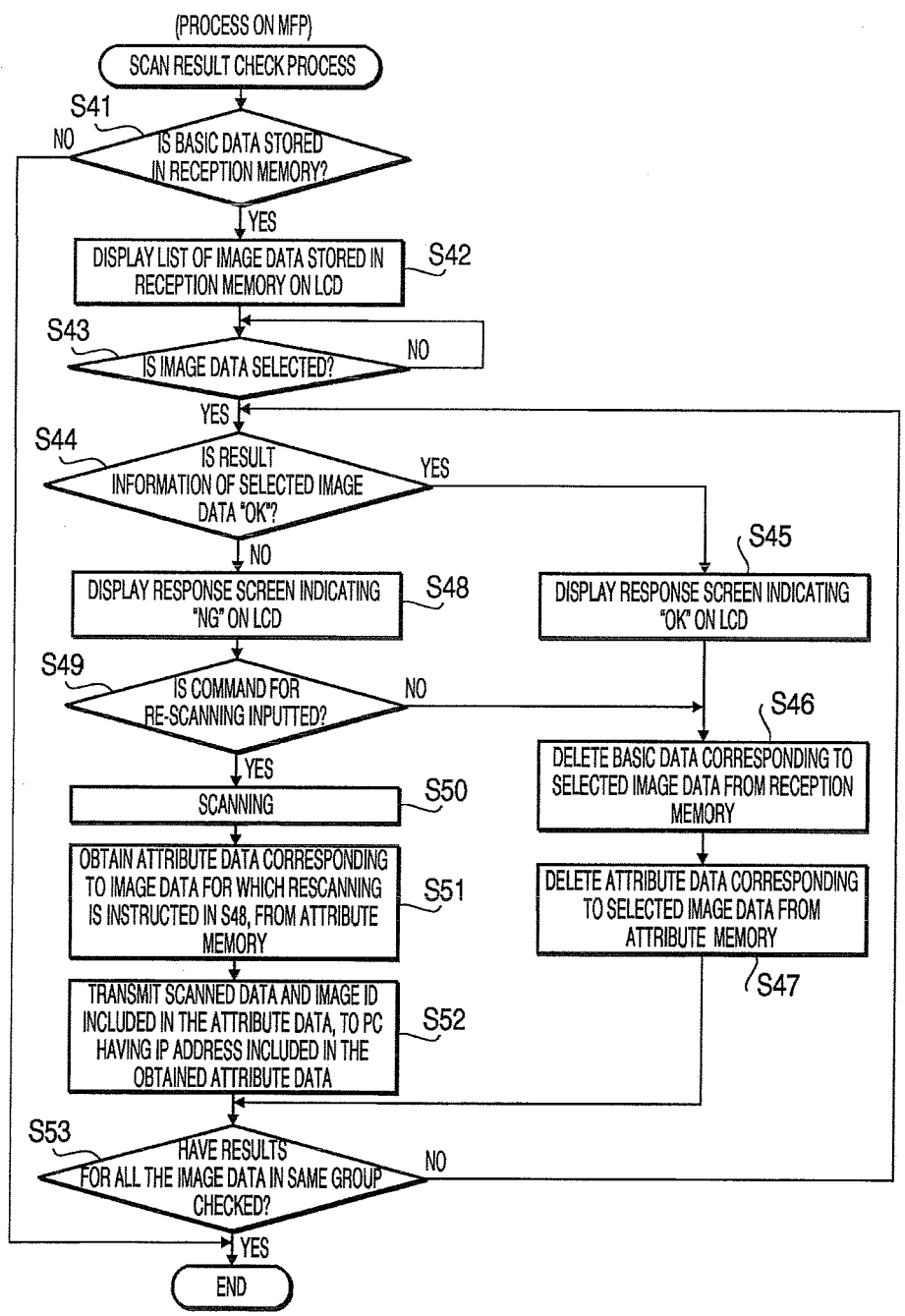
FIG. 4 is a flowchart illustrating a scan result check process executed by the MFP.

In the scan result check process shown in FIG. 4, step S52 may be executed after processing of step S53 and before transmission of the command indicating completion of transmission of scanned data. In this case, in step S52, the scanned data including the image data generated in step S51 by the time when the judgment result in step S53 becomes "YES" is transmitted in order in which the documents are read (i.e., in order in which the images are read).

Hereafter, processes to be executed on the PC 30 are explained with reference to FIGS. 5 and 6 and FIGS. 7D and 7E.

Figure 5:
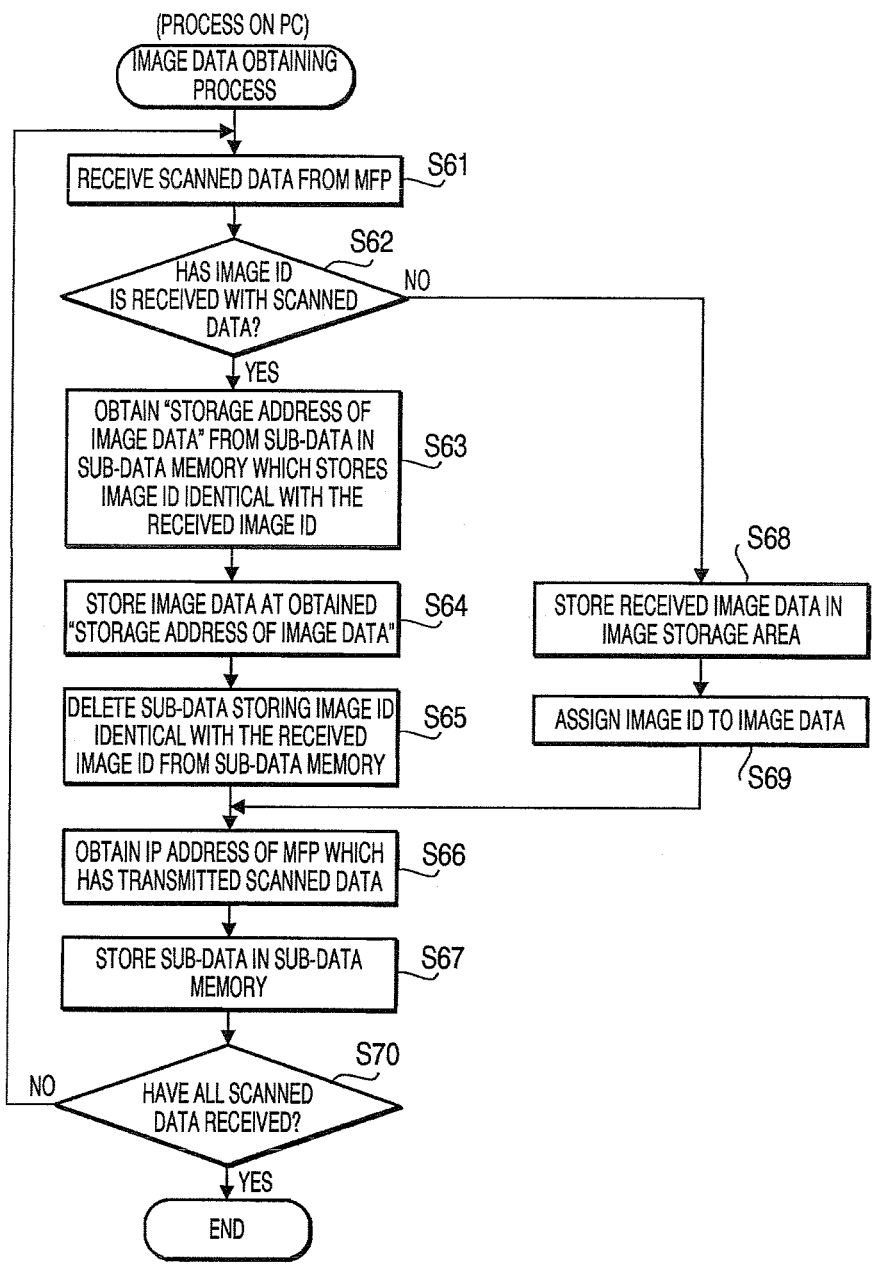
FIG. 5 is a flowchart illustrating an image data obtaining process executed by a PC.

First, an image data obtaining process is explained with reference to FIG. 5. The image data obtaining process is executed when the scanning or the re-scanning has executed on the MFP 10 and the PC 30 has received the command for indicating start of transmission of scanned data from the MFP 10.

First, the CPU 31 of the PC 30 receives the scanned data transmitted from the MFP 10 (step S61). Then, the CPU 31 judges whether an image ID is received together with the scanned data (step S62). When the image ID is received with the scanned data (S62: YES), transmission of the scanned data is caused by execution of the re-scanning on the MFP 10, and the image data indicated by the received image ID has already been received and has already been stored in the image storage area 34a. Therefore, the CPU 30 makes preparations to overwrite old image data with the image data received at this time.

More specifically, the CPU 31 searches for the sub-data including the image ID identical with the received image ID from the sub-data memory 33a, and obtains the storage address (i.e., an address in the image storage memory 34a) of the image data from the searched sub-data (step S63). Then, the CPU 31 stores the image data included in the received scanned data to the storage address of the image storage memory 34a (step S64). As described above, the old image data is overwritten with the received image data, it becomes possible to prevent the old image data from erroneously displayed on the LCD 35 in a scan result responding process which is described later.

After step S64 is processed, steps S65 to S67 are processed to update the sub-data already stored in the sub-data memory 33a. More specifically, the CPU 31 deletes, from the sub-data memory 33a, the sub-data including the image ID identical with the received image ID (step S65). Then, the CPU 31 instructs the MFP 10 to transmit the IP address of the MFP 10 which has transmitted the scanned data to obtain the IP address (step S66). Then, the CPU 31 stores the IP address of the MFP 10, the storage address of the image data, the comment data included in the scanned data received in step S61, the image ID received in step S61 in the sub-data memory 33a while associating these pieces of data with each other, as the sub-data (step S67).

When the image ID is not received together with the scanned data (S62: NO), transmission of the scanned data is caused by execution of the scanning on the MFP 10, and means that the image data is received for the first time. That is, an image ID has not been assigned to the received image data. Therefore, in this case, the CPU 31 stores the image data included in the received scanned data in the image storage area 34a (step S68). Then, the CPU 31 assigns an image ID to the stored image data (step S69). Then, the CPU 31 processes the steps S66 and S67.

If the number of transmissions of scanned data included in the command which has received before execution of the image data obtaining process is larger than one, the CPU 31 judges that the image data included in the scanned data transmitted from the MFP 10 is group image data. On the other hand, if the number of transmissions of scanned data included in the received command is one, a group ID is not assigned to the image ID.

When the image ID is not received together with the scanned data (S62: NO), the CPU 31 of the PC 30 stores, in the sub-data memory 33a as the sub-data, the IP address of the MFP 10 obtained in step S66, the "storage address" of the image data stored in step S68, the comment data included in the scanned data received in step S61, and the image ID assigned in step S69 while associating these pieces of data with each other (step S67).

Subsequently, the CPU 31 judges whether all the scanned data has been received (step S70). When the command indicating completion of transmission of scanned data has been received through the network interface 37 or when the scanned data has been received for the number of transmissions of scanned data included in the command received before execution of the image data obtaining process, the judgment result of step S70 becomes "YES". In this case, the image data obtaining process terminates. On the other hand, if the command indicating completion of transmission of scanned data is not included, the judgment result of step S70 becomes "NO". In this case, control returns to step S61.

Figure 6:
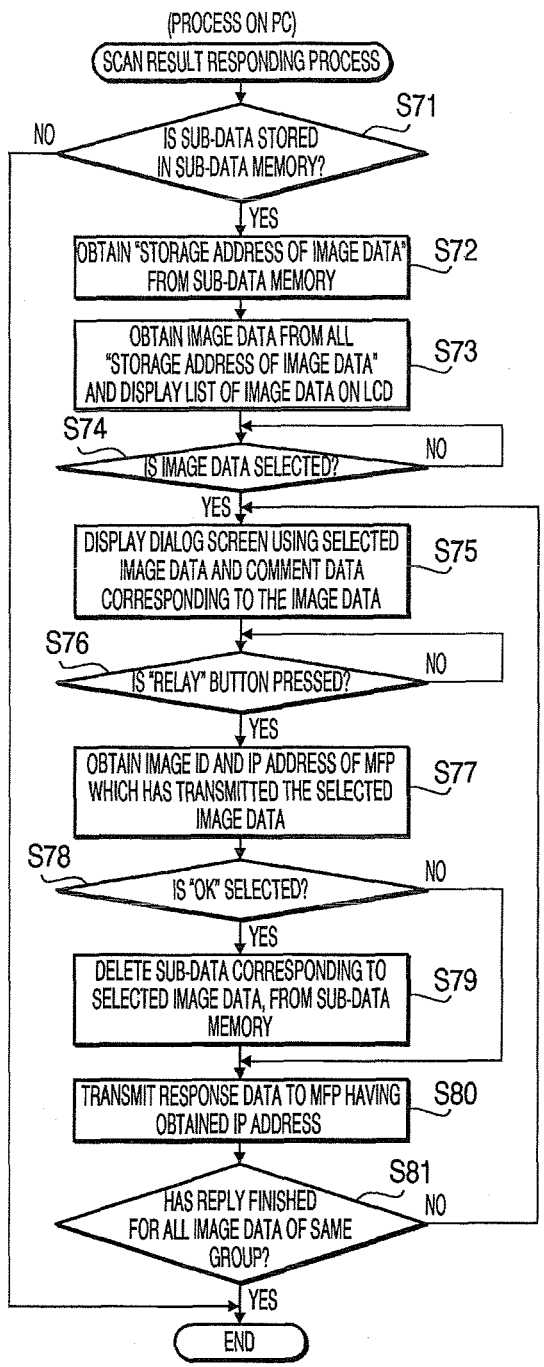
FIG. 6 is a flowchart illustrating a scan result responding process executed by the PC.

Hereafter, a scan result responding process executed on the PC 30 is explained with reference to FIG. 6. The scan result responding process is executed when the command for executing the scan result responding process is inputted by the operator of the PC 30, each time the scanned data is received through the image data obtaining process, or when the command indicating completion of transmission of scanned data is received.

First, the CPU 31 of the PC 30 judges whether the sub-data is stored in the sub-data memory 33a (step S71). When the sub-data is not stored in the sub-data memory 33a (S71: NO), no image data is stored in the image storage area 34a, and therefore in this case the scan result responding process terminates. When the sub-data is stored in the sub-data memory 33a (S71: YES), the CPU 31 obtains the "storage address of the image data" from all the sub-data stored in the sub-data memory 33a (step S72). Then, the CPU 31 obtains the image data from all the obtained "storage addresses of the image data", and displays a list of the image data on the LCD 35 (step S73). In step S73, the CPU 31 displays, on the LCD 35, a message requiring the operator of the PC 30 to select a piece of image data for which the responding data is generated.

Then, the CPU 31 judges whether the image data is selected (step S74). Step S74 is repeated until the image data is selected. When the image data is selected (S74: YES), control proceeds to step S75 where the CPU 31 obtains the comment data corresponding to the selected image data from the sub-data memory 33a, and displays a dialog screen using the obtained comment data and the selected image data, on the LCD 35 (step S75).

As shown in FIG. 7D, the dialog screen includes a received image data display screen P1, a received comment data display screen P2, a result input button P3, a text data input screen P4, an attached image data input screen P5 and a reply button P6. The received image data display screen P1 is used to display the image data (i.e., the image data received from the MFP 10) selected in step S74. The received comment data display screen P2 is used to display the comment data obtained from the sub-data memory 33a. The result input button P3 has radio buttons through which the operator inputs instructions as to whether the re-reading of the received image data is necessary. When one of the radio buttons is selected, the result information indicating whether the re-reading is necessary is generated in accordance with the type of the selected radio button.

The text data input screen P4 is used to input a message to be informed to the operator of the MFP 10. The attached image data input screen P5 is used to input attached image data used as a supplementary illustration for the message indicated by the text data. The reply button P6 is used to instruct the PC 30 to transmit the response data to the MFP 10. The PC 30 generates the response data to be transmitted to the MFP 10 by using the image data inputted to the screen P1 and various types of data inputted through the screens P3 to P5.

Referring back to FIG. 6, after step S75 is processed, the CPU 31 judges whether the reply button P6 is pressed (step S76). Step S76 is repeated until the reply button P6 is pressed. When the reply button P6 is pressed (S76: YES), the CPU 31 obtains, from the sub-data memory 33a, the image ID and the IP address of the MFP 10 which has transmitted the image data selected in step S74 (step S77).

Subsequently, the CPU 31 judges whether the radio button "OK" indicating that the re-reading of the image corresponding to the image data is not necessary is selected (step S78). The operation concerning the state where the radio button "OK" is selected is explained with reference to FIG. 7D, and the operation concerning the state where the radio button "NG" is selected is explained with reference to FIG. 7E.

As shown in FIG. 7D, when the radio button "OK" of the result input button P3 is selected (S78: YES), re-reading of the image is not necessary, and in this case words "Thank you." are inputted to the text data input screen P4, and the attached image data input screen P5 remains in an empty state. On the other hand, when the radio button "NG" of the result input button P3 is selected as shown in FIG. 7E (S78: NO), re-reading of the image is necessary, and in this case words "Please correct orientation of a document as indicated below." are inputted, and an image as a supplementary illustration of the text data is inputted to the attached image data input screen P5.

Referring back to FIG. 6, when the radio button "OK" is selected (S78: YES), it is not necessary to transmit again the response data to the MFP 10 after returning the response data of the image data selected in step S74 to the MFP 10 in step S80. That is, use of the sub-data corresponding to the image data selected in step S74 becomes unnecessary. Therefore, the CPU 31 deletes the sub-data corresponding to the image data selected in step S74 from the sub-data memory 33a (step S79). Then, the CPU 31 of the PC 30 combines together the image data displayed in the screen P1, the result information generated by selection of the radio button "YES", the text data inputted to the screen P4 (see FIG. 7D) and the image ID to the MFP 10 having the IP address obtained in step S77, and transmits the combined data to the MFP 10 having the IP address obtained in step S77, as the response data (step S80). In response to receipt of the response data by the MFP 10, the result screen shown in FIG. 7C is displayed on the LCD 15 of the MFP 10.

As described above, it is possible to include the text data having the comment concerning the image data and the attached image data for indicating correction of arrangement of the image into the response data transmitted to the MFP 10. Therefore, in addition to the result information regarding as to whether the re-reading is necessary, cautions to be taken on the re-reading of the image can be transmitted to the MFP 10.

After step S80 is processed, the CPU 31 judges whether the replies for all the image data of the identical group with the image data selected in step S74 have finished (step S81). More specifically, when the group ID is assigned to the image ID corresponding to the image data selected in step S74, the CPU 31 searches for other image data to which the identical group ID is assigned, and the CPU 31 judges whether the replies to all the image data (included in the group) have finished. When the replies for all the image data have not finished (S81: NO), control returns to step S75. when the replies for all the image data have finished (S81: YES), the CPU 31 transmits the command indicating completion of the reply to the image data, to the MFP 10. Then, the scan result responding process terminates.

If the image data selected in step S74 is a single piece of image data, no group ID is assigned to the image ID corresponding to the selected image. Therefore, in this case, the judgment result of step S81 becomes "YES".

As described above, according to the embodiment, the MFP 10 transmits the scanned data including generated image data to the PC 30. In response to receipt of the scanned data, the PC 30 becomes able to generate response data including an evaluation for the image data included in the scanned data. When the response data is generated, the PC 30 transmits the response data to the MFP 10. In response to receipt of the response data, the MFP 10 displays the result screen on the LCD 35 as shown in FIG. 7B or 7C. That is, the MFP 10 displays, on the LCD 35, information indicating whether re-reading of the image of the image data is necessary. Such a configuration makes it possible to inform the operator of the MFP 10 whether re-reading of the image is necessary, without requiring the operator of the PC 30 to move to the place where the MFP 10 is installed. That is, even if the MFP 10 and the PC 30 are positioned away from each other and therefore conversation between the operator of the MFP 10 and the operator of the PC 30 is not possible, the operator of the PC 30 is able to inform the operator of the MFP 10 of the need for re-reading of the image. It should be understood that such an advantage is emphasized particularly in the case where the operator of the PC 30 is a mobility-impaired user. It should also be understood that it is possible to inform the operator of the MFP 10 of the need for re-reading of the image without providing more than one MFP 10 in the image communication system 1.

With regard to the group image data, the PC 30 assigns the identical group ID to the image ID of the image data. Therefore, it is possible to continuously generate the response data for each image data belonging to the group image data. As a result, it is possible to effectively generate the response data. Since the identical group ID is assigned to the image ID for the group image data, the MFP 10 is able to continuously check the result information for the image data in the group image data. That is, it is possible to effectively check the result information.

Although the present invention has been described in considerable detail with reference to certain preferred embodiments thereof, other embodiments are possible.

In the above described scan result responding process, the result information "OK" or "NG" is transmitted from the PC 30 to the MFP 10. That is, the MFP 10 is configured to process two types of information. The image communication system may be configured such that only the result information "NG" is transmitted from the PC 30 to the MFP 10. In this case, it is possible to eliminate the need for use of the group ID. As a result, it becomes possible to eliminate the configuration for processing the result information "OK" and the configuration for handling the group ID.

Additionally or alternatively to the above described result screen shown in the LCD 15, a first type of melody may be produced when the result information included in the response data is "NG", and a second type of melody may be produced when the result information included in the response data is "OK". In this case, it is also possible to inform the operator of the MFP 10 whether the re-reading of the image is necessary, without requiring the operator of the PC 30 to move to the place of the MFP 10.

If a handset which is able to communicate with the MFP 10 through an internal line is provided, the image communication system may be configured as follows. In this case, the handset is placed near the PC 30. The PC 30 transmits response data including the result information "NG" and an extension number of the handset to the MFP 10. In response to receipt of the response data, the MFP 10 obtains the extension number included in the response data, and automatically makes a telephone call to the extension number. In this case, the operator of the PC 30 is able to inform the operator of the MFP 10 of the result information indicating whether the re-reading is necessary, and to tell cautions to be taken for the re-reading of the image to the operator of the MFP 10.

In step S32 of the scan result obtaining process, the MFP 10 obtains the IP address of the PC 30 which has transmitted the response data. However, when more than one PC 30 is provided in the image communication system 1, the IP address of the PC 30 may be stored in the MFP 10 in advance to skip processing of step S32. In this case, the IP address of the PC may be stored in step S36 in the attribute memory 13b.

In the scanning, the command indicating the number of transmissions of scanned data and the command indicating completion of transmission of scanned data are transmitted from the MFP 10 to the PC 30, and are handled by the PC 30. However, the image communication system 1 may be configured such that only one of these commands is transmitted from the MFP 10 to the PC 30, and is handled by the PC 30. In this case, it is possible to eliminate the configuration for the unnecessary command from the image communication system 1.

What is claimed is:

1. An image communication system, comprising:
an image reading device; and
a communication device which is communicatably connected to the image reading device, wherein the image reading device comprises:

an image reading unit configured to execute a reading operation to read an image from a document to generate image data corresponding to the read image;

a transmission unit configured to transmit the image data generated by the image reading unit to the communication device;

an evaluation information receiving unit configured to receive evaluation information from the communication device, wherein the evaluation information indicates that re-reading of the image corresponding to the image data transmitted to the communication device is necessary and includes an additional image corresponding to the image data; and a display unit configured to display the evaluation information received by the evaluation information receiving unit, wherein the communication device comprises:

an image data receiving unit configured to receive the image data from the image reading device communicatably connected to the communication device;

an image data display unit configured to display the image corresponding to the image data received by the image data receiving unit;

an additional image input unit configured to input the additional image corresponding to the image data;

a command reception unit configured to receive an execution command for executing re-reading of the image corresponding to the image data displayed by the image data display unit;

an evaluation information generation unit configured such that, in response to receipt of the execution command by the command reception unit, the evaluation information generation unit generates the evaluation information which indicates that re-reading of the image corresponding to the image data indicated by the execution command is necessary and includes the additional image, corresponding to the image data, inputted by the additional image input unit of the communication device; and an information transmission unit configured to transmit the evaluation information generated by the evaluation information generation unit, including the additional image inputted by the additional image input unit, to the image reading device.

2. The image communication system according to claim 1, wherein the image reading device further comprises a reception unit configured such that, in response to receipt of the evaluation information by the evaluation information receiving unit, the reception unit receives a reading command for re-reading of the image, wherein:

the image reading unit of the image reading device executes the reading operation when the reading command is received by the command reception unit; and the transmission unit of the image reading device transmits the image data generated by the image reading unit to the communication device which has transmitted the evaluation information.

3. The image communication system according to claim 2, wherein the image reading device further comprises an identification obtaining unit configured such that, in response to receipt of the evaluation information by the evaluation information receiving unit, the identification obtaining unit obtains identification information uniquely assigned to the communication device, wherein the transmission unit of the image reading device is configured to:

determine the communication device specified by the identification information as a transmission target of the image data generated by the image reading unit; and transmit the image data generated by the image reading unit to the communication device determined as the transmission target.

4. The image communication system according to claim 2, wherein:

the reception unit of the image reading device further receives comments inputted by an operator of the image reading device;

the transmission unit of the image reading device transmits the image data together with the comments inputted through the reception unit; and the image data display unit of the communication device displays the image data received from the image reading device together with the comments received from the operator of the image reading device.

5. The image communication system according to claim 1, wherein the communication device further comprises:

a storage unit configured to store the image data received by the image data receiving unit;

a display control unit configured to control the image data display unit to display the image corresponding to the image data stored in the storage unit; and an image data changing unit configured to change the image data stored in the storage unit to the image data received by the image data receiving unit in response to receipt of the image data by the image data receiving unit from the image reading device which has received the evaluation information transmitted by the information transmission unit.

6. The image communication system according to claim 1, wherein the communication device further comprises a communication device side identification obtaining unit configured such that, in response to receipt of the image data by the image data receiving unit, the communication device side identification obtaining unit obtains identification information which is uniquely assigned to the image reading device and is transmitted by the image reading device, wherein the information transmission unit of the communication device is configured to:

determine the image reading device specified by the identification information obtained by the communication device side identification obtaining unit as a transmission target of the evaluation information; and transmit the evaluation information generated by the evaluation information generation unit to the image reading device determined as the transmission target.

7. The image communication system according to claim 1, wherein the communication device further comprises:

an information reception unit configured to receive information inputted by an operator of the communication device; and an information display unit configured to display the information received through the information reception unit together with the image corresponding to the image data, wherein the evaluation information generation unit generates the evaluation information such that the evaluation information includes the information inputted through the information reception unit.

8. An image reading device, comprising:
an image reading unit configured to execute a reading operation to read an image from a document to generate image data corresponding to the read image;
a transmission unit configured to transmit the image data generated by the image reading unit to a communication device which is communicatably connected to the image reading device;
an evaluation information receiving unit configured to receive evaluation information from the communication device, wherein the evaluation information indicates that re-reading of the image corresponding to the image data transmitted to the communication device is necessary and includes an additional image, corresponding to the image data, inputted by an additional image input unit of the communication device; and
a display unit configured to display the evaluation information received by the evaluation information receiving unit, such that the additional image inputted by the additional image input unit of the communication device is displayed on the display unit of the image reading device.

9. The image reading device according to claim 8,
further comprising a reception unit configured such that, in response to receipt of the evaluation information by the evaluation information receiving unit, the reception unit receives a reading command for re-reading of the image, wherein:
the image reading unit executes the reading operation when the reading command is received by the command reception unit; and
the transmission unit transmits the image data generated by the image reading unit to the communication device which has transmitted the evaluation information.

10. The image reading device according to claim 9,
further comprising an identification obtaining unit configured such that, in response to receipt of the evaluation information by the evaluation information receiving unit, the identification obtaining unit obtains identification information uniquely assigned to the communication device,
wherein the transmission unit is configured to:
determine the communication device specified by the identification information as a transmission target of the image data generated by the image reading unit; and
transmit the image data generated by the image reading unit to the communication device determined as the transmission target.

11. The image reading device according to claim 9,
wherein:
the reception unit further receives comments inputted by an operator of the image reading device;
the transmission unit transmits the image data together with the comments inputted through the reception unit; and
the image data display unit displays the image data received from the image reading device together with the comments received from the operator of the image reading device.

12. A communication device, comprising:
an image data receiving unit configured to receive image data from an image reading device communicatably connected to the communication device;
an image data display unit configured to display an image corresponding to the image data received by the image data receiving unit;
an additional image input unit configured to input an additional image for the corresponding image data;
a command reception unit configured to receive an execution command for executing re-reading of the image corresponding to the image data displayed by the image data display unit; and
an evaluation information generation unit configured such that, in response to receipt of the execution command by the command reception unit, wherein the evaluation information generation unit generates evaluation information indicating that re-reading of the image corresponding to the image data indicated by the execution command is necessary and including the additional image, corresponding to the image data, inputted by the additional image input unit; and
an information transmission unit configured to transmit the evaluation information generated by the evaluation information generation unit, including the additional image inputted by the additional image input unit, to the image reading device.

13. The communication device according to claim 12,
further comprising:
a storage unit configured to store the image data received by the image data receiving unit;
a display control unit configured to control the image data display unit to display the image corresponding to the image data stored in the storage unit; and
an image data changing unit configured to change the image data stored in the storage unit to the image data received by the image data receiving unit in response to receipt of the image data by the image data receiving unit from the image reading device which has received the evaluation information transmitted by the information transmission unit.

14. The communication device according to claim 12,
further comprising a communication device side identification obtaining unit configured such that, in response to receipt of the image data by the image data receiving unit, the communication device side identification obtaining unit obtains identification information which is uniquely assigned to the image reading device and is transmitted by the image reading device,
wherein the information transmission unit is configured to:
determine the image reading device specified by the identification information obtained by the communication device side identification obtaining unit as a transmission target of the evaluation information; and
transmit the evaluation information generated by the evaluation information generation unit to the image reading device determined as the transmission target.

15. The communication device according to claim 12,
further comprising:
an information reception unit configured to receive information inputted by an operator of the communication device; and
an information display unit configured to display the information received through the information reception unit together with the image corresponding to the image data, wherein the evaluation information generation unit generates the evaluation information such that the evaluation information includes the information inputted through the information reception unit.

* * * * *